United States Patent
Lai et al.

(10) Patent No.: US 11,909,965 B2
(45) Date of Patent: *Feb. 20, 2024

(54) METHOD AND APPARATUS FOR NON-LINEAR ADAPTIVE LOOP FILTERING IN VIDEO CODING

(71) Applicant: HFI Innovation Inc., Zhubei (TW)

(72) Inventors: Chen-Yen Lai, Hsinchu (TW);
Ching-Yeh Chen, Hsinchu (TW);
Tzu-Der Chuang, Hsinchu (TW);
Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,362

(22) Filed: Aug. 12, 2022

(65) Prior Publication Data
US 2022/0394246 A1    Dec. 8, 2022

Related U.S. Application Data

(63) Continuation of application No. 17/424,656, filed as application No. PCT/CN2020/073567 on Jan. 21, 2020.
(Continued)

(51) Int. Cl.
*H04N 19/117* (2014.01)
*H04N 19/82* (2014.01)
(Continued)

(52) U.S. Cl.
CPC ......... *H04N 19/117* (2014.11); *H04N 19/159* (2014.11); *H04N 19/82* (2014.11); *H04N 19/176* (2014.11)

(58) Field of Classification Search
CPC .... H04N 19/117; H04N 19/159; H04N 19/82; H04N 19/176; H04N 19/167;
(Continued)

(56) References Cited

U.S. PATENT DOCUMENTS 9,432,700 B2    8/2016 Chen et al.
9,729,893 B2    8/2017 Lee et al.
(Continued)

FOREIGN PATENT DOCUMENTS

CN    103051890 A    4/2013
CN    107925762 A    4/2018
(Continued)

OTHER PUBLICATIONS

International Search Report and Written Opinion dated Apr. 9, 2020, issued in application No. PCT/CN2020/073567.
(Continued)

*Primary Examiner* — Joseph W Becker
(74) *Attorney, Agent, or Firm* — McClure, Qualey & Rodack, LLP

(57) ABSTRACT

Methods and apparatus for Adaptive Loop Filter (ALF) processing of reconstructed video are disclosed. According to one implementation, a method receives reconstructed pixels of a current block and determines one or more clipping values for the ALF processing, wherein a target clipping value is always signaled at an encoder side or parsed at a decoder side even if the target clipping value is zero. The method then derives a current ALF output for the current block, wherein the current ALF output has a weighted sum of clipped differences and each of the original differences is calculated between a first reconstructed pixel at a non-center filter location and a center reconstructed pixel at a center filter location, and each of the original differences is clipped according to a corresponding clipping
(Continued)

value to form one clipped difference. The method then provides filtered-reconstructed pixels.

8 Claims, 11 Drawing Sheets

Related U.S. Application Data

(60) Provisional application No. 62/832,349, filed on Apr. 11, 2019, provisional application No. 62/796,608, filed on Jan. 25, 2019.

(51) Int. Cl.
*H04N 19/176* (2014.01)
*H04N 19/159* (2014.01)

(58) Field of Classification Search
CPC .... H04N 19/186; H04N 19/86; H04N 19/107; H04N 19/70
See application file for complete search history.

(56) References Cited

U.S. PATENT DOCUMENTS

| | | | |
|---|---|---|---|
| 9,807,395 | B2 | 10/2017 | Kerofsky et al. |
| 9,838,716 | B2 | 12/2017 | Sato |
| 10,469,876 | B2 | 11/2019 | Chen et al. |
| 11,057,627 | B2 | 7/2021 | Kim et al. |
| 11,589,041 | B2 | 2/2023 | Huang et al. |
| 2011/0274158 | A1 | 11/2011 | Fu et al. |
| 2013/0022104 | A1 | 1/2013 | Chen et al. |
| 2013/0156097 | A1 | 6/2013 | Budagavi et al. |
| 2013/0215974 | A1 | 8/2013 | Chong et al. |
| 2018/0091812 | A1 | 3/2018 | Guo et al. |
| 2018/0184128 | A1 | 6/2018 | Chen et al. |
| 2018/0270479 | A1 | 9/2018 | Chen et al. |
| 2019/0045224 | A1 | 2/2019 | Huang et al. |
| 2020/0029080 | A1 | 1/2020 | Kim et al. |

FOREIGN PATENT DOCUMENTS

| | | |
|---|---|---|
| CN | 108605143 A | 9/2018 |
| EP | 3 297 282 A1 | 3/2018 |
| RU | 2 647 704 C1 | 3/2018 |
| RU | 2 665 308 C2 | 8/2018 |
| TW | 201828708 A | 8/2018 |
| WO | 2012/094751 A1 | 7/2012 |
| WO | 2017/201011 A1 | 11/2017 |
| WO | 2018/174593 A1 | 9/2018 |
| WO | 2019/010267 A1 | 1/2019 |
| WO | WO-2019135655 A1 * | 7/2019 |

OTHER PUBLICATIONS

Taquet, J., et al.; "Non-Linear Adaptive Loop Filter;" Joint Video Experts Team (JVET) of ITU-T SG 16 WP 3 and ISO/IEC JTC 1/SC 29/WG 11; Jan. 2019; pp. 1-86.
Russian language office action dated Apr. 28, 2022, issued in application No. RU 2021122300.
Chinese language office action dated Mar. 17, 2023, issued in application No. CN 202080010751.5.
Extended European Search Report dated Oct. 12, 2022, issued in application No. EP 20744863.0.
Unno, K., et al.; "Non-CE5: A simplification of clipping thresholds for Non-Linear ALF;" Joint Video Experts Team (JVET) of ITU-T SG 16 WP 3 and ISO/IEC JTC 1/SC 29/WG 11; Jun. 2019; pp. 1-6.
Chen, H., et al.; "Description of SDR, HDR and 360° video coding technology proposal by Huawei, GoPro, HiSilicon, and Samsung—general application scenario;" Joint Video Experts Team (JVET) of ITU-T SG 16 WP 3 and ISO/IEC JTC 1/SC 29/WG 11; Apr. 2018; pp. 1-132.
Chinese langue Notice of Allowance dated Jun. 12, 2023, issued in application No. CN 202080010751.5.
Xie, L.; "Optimization of High Efficiency Video Coding Loop Filtering Technology;" Electronic Technology Information Science (translated by Google translation); Apr. 2018; pp. 1-91.
English language translation of abstract of "Optimization of High Efficiency Video Coding Loop Filtering Technology;" (p. 7 of attachment).
Zhao, N.; "Research on Key Technology in Video Image Pre-processing;" Electronic Technology Information Science (translated by Google translation); Jul. 2012; pp. 1-68.
English language translation of abstract of "Research on Key Technology in Video Image Pre-processing;" (pp. 6-7 of attachment).
Choi, Y., et al.; "Exploration of Practical HEVC/H.265 Sample Adaptive Offset Encoding Policies;" IEEE Signal Processing Letters; vol. 22; No. 4; Apr. 2015; pp. 465-468.

* cited by examiner $c2' = c2 + c0$ $c5' = c5 + c1$
$c6' = c6 + c2 + c0$
$c7' = c7 + c3$ $c10' = c10 + c4 + c8$
$c11' = c11 + c5 + c7 + c1 + c3$
$c12' = c12 + 2*c6 + 2*c2 + 2*c0$

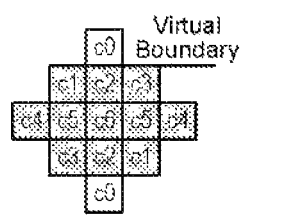 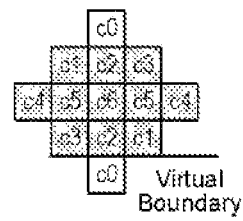
$c2' = c2 + c0$
*Fig. 11A*  *Fig. 11B*
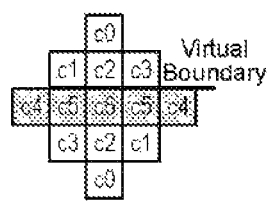 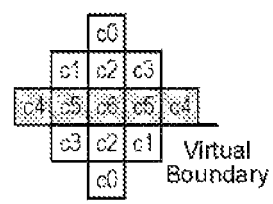
$c5' = c5 + c1 + c3$
$c6' = c6 + 2*c2 + 2*c0$
*Fig. 11C*  *Fig. 11D*
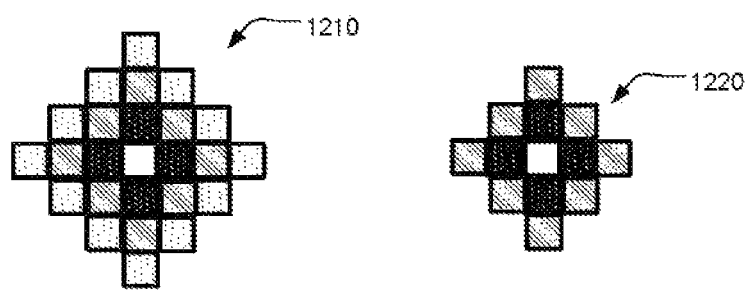
*Fig. 12*

# METHOD AND APPARATUS FOR NON-LINEAR ADAPTIVE LOOP FILTERING IN VIDEO CODING

CROSS REFERENCE TO RELATED APPLICATIONS

The present invention is a Continuation of pending U.S. patent application Ser. No. 17/424,656, filed Jul. 21, 2021, which is a 371 National Phase of PCT Application, Serial No. PCT/CN2020/073567, filed Jan. 21, 2020, which claims priority to U.S. Provisional Patent Application, Ser. No. 62/796,608, filed Jan. 25, 2019 and 62/832,349, filed Apr. 11, 2019. The U.S. Provisional Patent Applications are hereby incorporated by reference in their entireties.

FIELD OF THE INVENTION

The present invention relates to adaptive loop filter (ALF) processing in a video coding system. In particular, the present invention relates to non-linear ALF processing in a video encoder or decoder.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

The coding process in HEVC is applied according to Largest Coding Unit (LCU). The LCU is adaptively partitioned into coding units using quadtree. In each leaf CU, DF is performed for each 8×8 block and in HEVC Test Model Version 4.0 (HM-4.0), the DF is applies to 8×8 block boundaries. For each 8×8 block, horizontal filtering across vertical block boundaries is first applied, and then vertical filtering across horizontal block boundaries is applied. During processing of a luma block boundary, four pixels of each side are involved in filter parameter derivation, and up to three pixels on each side can be changed after filtering. For horizontal filtering across vertical block boundaries, unfiltered reconstructed pixels (i.e., pre-DF pixels) are used for filter parameter derivation and also used as source pixels for filtering. For vertical filtering across horizontal block boundaries, unfiltered reconstructed pixels (i.e., pre-DF pixels) are used for filter parameter derivation, and DF intermediate pixels (i.e. pixels after horizontal filtering) are used for filtering. For DF processing of a chroma block boundary, two pixels of each side are involved in filter parameter derivation, and at most one pixel on each side is changed after filtering. For horizontal filtering across vertical block boundaries, unfiltered reconstructed pixels are used for filter parameter derivation and are used as source pixels for filtering. For vertical filtering across horizontal block boundaries, DF processed intermediate pixels (i.e. pixels after horizontal filtering) are used for filter parameter derivation and also used as source pixel for filtering.

Sample Adaptive Offset (SAO) 131 is also adopted in HM-4.0, as shown in FIG. 1A. SAO can be regarded as a special case of filtering where the processing only applies to one pixel. In SAO, pixel classification is first done to classify pixels into different groups (also called categories or classes). The pixel classification for each pixel is based on a 3×3 window. Upon the classification of all pixels in a picture or a region, one offset is derived and transmitted for each group of pixels. ALF is not adopted by the HEVC (High Efficiency Video Coding). However, ALF is being considered for the emerging video coding standard, named VVC (Versatile Video Coding). The filter coefficients of ALF are derived by minimizing the sum of the distortion between filtered samples and original samples. Furthermore, the derived filter coefficients are signaled in the bitstream with on/off control flags. Multiple filters can be used in one slice and the filter selection includes implicit selection by block-based classification and explicit selection by signaled syntax.

In HM-4.0, DF is applied on 8×8 block boundaries to reduce the visibility of artefacts at block boundaries. FIG. 2 shows a vertical boundary 212 in block 210 and a horizontal boundary 222 in block 220, where 8×8 blocks are partly shown (4×8 or 8×4). In one picture, all vertical boundaries can be horizontally filtered in parallel, and then all horizontal boundaries can be vertically filtered in parallel. During processing of a luma boundary, four pixels of each side ($p_0$-$p_3$, $q_0$-$q_3$) are involved in filter parameter derivation, and at most three pixels of each side ($p_0$-$p_2$, $q_0$-$q_2$) can be changed after filtering. For luma horizontal DF, pre-DF pixels (i.e. pixels before horizontal DF) are used for deriving filter parameters and filtering. For luma vertical DF, pre-DF pixels are used for deriving filter parameters, and H-DF pixels (i.e. pixels after horizontal DF) are used for filtering. During processing of a chroma boundary, two pixels of each side ($p_0$-$p_1$, $q_0$-$q_1$) are involved in filter parameter derivation, and at most one pixel of each side ($p_0$, $q_0$) is changed after filtering. For chroma horizontal DF, pre-DF pixels are used for deriving filter parameters and filtering. For chroma vertical DF, H-DF pixels are used for deriving filter parameters and filtering.

In HM-4.0, SAO is applied to luma and chroma components, and each of the luma components is independently processed. SAO can divide one picture into multiple LCU-aligned regions, and each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands as shown in FIG. 3. After pixel classification, one offset is derived for all pixels of each band, and the offsets of center 16 bands or outer 16 bands are selected and coded. As for EO, it uses two neighboring pixels of a to-be-processed pixel to classify the pixel into a category. The four EO types correspond to 0°, 90°, 135°, and 45° as shown in FIG. 4. Similar to BO, one offset is derived for all pixels of each category except for category 0, where Category 0 is forced to use zero offset. Table 1 shows the EO pixel classification, where "C" denotes the pixel to be classified.

TABLE 1

| Category | Condition |
|---|---|
| 1 | C < two neighbors |
| 2 | C < one neighbor && C == one neighbor |

TABLE 1-continued

| Category | Condition |
|---|---|
| 3 | C > one neighbor && C == one neighbor |
| 4 | C > two neighbors |
| 0 | None of the above |

In HM-4.0, ALF has two filter shape options, cross11×5 (510) and snowflake5×5 (520), for luma and chroma, as shown in FIG. 5. In each picture, the luma component can choose one shape, and the chroma components can choose one shape. Up to 16 luma filters and at most one chroma filter can be applied for each picture. In order to allow localization of ALF, there are two modes for luma pixels to select filters. One is a region-based adaptation (RA) mode, and the other is a block-based adaptation (BA) mode. The RA mode divides one luma picture into 16 regions. Once the picture size is known, the 16 regions are determined and fixed. The regions can be merged, and one filter is used for each region after merging. The BA mode uses edge activity and direction as a property for each 4×4 block. Calculating the property of a 4×4 block (610) requires 5×5 pixels (612), as shown in FIG. 6. After the properties of 4×4 blocks are calculated, they are classified into 15 categories. The categories can be merged, and one filter is used for each category after merging. As for the chroma components, since they are relatively flat, no local adaptation is used, and the two components of a picture share one filter.

In the emerging VVC (Versatile Video Coding) standard being developed, more flexible ALF has been disclosed to improve the performance. For block-based classification, one picture is partitioned into several 4×4 luma blocks and one group index is derived for each 4×4 luma block. The group index is used to select luma filter from a filter set. In order to reduced required data for the filter coefficients, the filter coefficients may be rotated based on characteristics of one 4×4 block so that some coefficients don't need to be transmitted. In VVC, up to 25 groups can be used for ALF of one luma filter set, which is associated with 5 activity levels based on the gradients magnitude and 5 directions based on the gradients direction. Different groups can share one filter, where multiple groups can be merged into one merged group and one merged group has one filter.

When LCU-based processing is used for DF, SAO, and ALF, the entire decoding process can be done LCU by LCU in a raster scan with an LCU-pipelining fashion for parallel processing of multiple LCUs. In this case, line buffers are required for DF, SAO, and ALF because processing one LCU row requires pixels from the above LCU row. If off-chip line buffers (e.g. DRAM) are used, the external memory bandwidth and power consumption will be increased; if on-chip line buffers (e.g. SRAM) are used, the chip area will be increased. Therefore, although line buffers are already much smaller than picture buffers, it is still desirable to reduce line buffers.

FIG. 7 explains the number of luma line buffers required for DF, SAO, and ALF with LCU-based decoding. Given a current LCU (lower H. LCU boundary 710 and left V. LCU boundary 712), lines A-J are first processed by horizontal DF and then by vertical DF. Next, it is suggested to delay the horizontal DF for lines K-N until the lower LCU is available in order to avoid line buffers of H-DF pixels for the vertical DF for lines K-N, which cannot be processed at this moment because the lower LCU is not yet available and DF needs four pre-DF pixels and four H-DF pixels on each side of the horizontal boundary for deriving filter parameters and filtering, respectively, as illustrated by the 4-pixel stripe (720). Therefore, four lines (K-N) of pre-DF pixels have to be stored for DF. Next, SAO is going to be applied on DF output pixels. Since the vertical DF for lines K-N will not change line K, horizontal DF can be additionally applied on line K for SAO to process line J, as illustrated by the 3×3 square (730). Please note that the H-DF pixels of line K will not be stored in the line buffer and have to be generated again when the lower LCU comes, which is not a problem in hardware. After SAO processes lines A-J, the 4×4 block property, as illustrated by the 4×4 square (740), can be calculated. The 5×5 supporting area (742) is indicated. At this moment ALF can process lines A-H. After this, no further process can be done for the current LCU until the lower LCU comes. When the lower LCU comes, lines K-P are first processed by DF, and then lines K-P are processed by SAO. When SAO is applied to line K, line J is required. Therefore, one line (J) of DF output pixels has to be stored for SAO. Next, the 4×4 block properties for lines I-P are calculated. Finally, lines I-P can be filtered by ALF. When line I is filtered by ALF, it requires lines G-K, as illustrated by the filter shape (750) and the center of the filter (752) is indicated. However, calculating block properties of lines I-J still needs lines F-J. Therefore, five lines (F-J) of SAO output pixels have to be stored for ALF. In total, the entire in-loop filtering requires 10 luma line buffers. When the entire decoding system is considered, since the Intra luma prediction already stores one line (N) of pre-DF pixels, this luma line buffer can be shared. Moreover, if a filter index line buffer can be used to store BA mode filter selections for lines G-J, it is not necessary to compute the block properties again during filtering of lines I-J. In this way, one line (F) of SAO output pixels can be saved for ALF. The filter index line buffer requires only 4 bits per 4×4 block, which is only about 10% in comparison with the pixel line buffer.

FIG. 8 explains the number of chroma line buffers required for DF, SAO, and ALF with LCU-based decoding. Given a current LCU (H. LCU boundary 810 and V. LCU boundary 812), lines A-M are first processed by horizontal DF, and then lines A-L are processed by vertical DF. Next, it is suggested to delay the horizontal DF for lines N until the lower LCU comes in order to share the line buffer of pre-DF pixels of line N with intra chroma prediction. As for the vertical DF for lines M-N, it has to wait for the lower LCU. Please recall that chroma DF reads two H-DF pixels and may write one pixel on each side of the boundary, as illustrated by the 2-pixel stripe. Therefore, one line (M) of H-DF pixels and one line (N) of pre-DF pixels have to be stored for DF. Next, SAO is going to be applied on DF output pixels. Since the vertical DF for lines M-N will not change line M, H-DF pixels of line M are also DF output pixels of line M, and SAO can process line L, as illustrated by the 3×3 square (815). After SAO processes lines A-L, ALF can process lines A-J. After this, no further process can be done for the current LCU until the lower LCU comes. When the lower LCU comes, lines N-P are first processed by horizontal DF, and then lines M-P are processed by vertical DF and by SAO. When SAO processes line M, line L is required. Therefore, one line (L) of DF output pixels has to be stored for SAO. Finally, lines K-P can be filtered by ALF. When line K is filtered, it requires lines I-M, as illustrated by the filter shape (820) with the center of the filter (822) is indicated. Therefore, four lines (I-L) of SAO output pixels have to be stored for ALF. In total, the entire in-loop filtering requires seven chroma line buffers.

Virtual Boundaries to Reduce Line Buffer Usage

In order to eliminate the line buffer requirements of SAO and ALF, we introduce the concept of virtual boundary (VB). As shown in FIG. 9A, VBs are upward shifted horizontal LCU boundaries by N pixels. In FIG. 9B, VBs are left shifted vertical LCU boundaries by N pixels. For each LCU, SAO and ALF can process pixels above the VB before the lower LCU comes but cannot process pixels below the VB until the lower LCU comes, which is caused by DF. With consideration of the DF in HM-4.0, the space between the proposed VB and the horizontal LCU boundary is set as three pixels for luma (i.e. N=3 in FIG. 9A and FIG. 9B) and one pixel for chroma (i.e. N=1 in FIG. 9A and FIG. 9B). SAO and ALF are modified to ensure that every to-be-processed pixel on one side of a VB does not require any data access from the other side of the VB unless the data can become available in time without using any additional line buffer.

In JVET 11-th meeting, ALF with 4×4 block-based adaptation is adopted in the draft of the next generation video coding standard, Versatile Video Coding (VVC). For one 4×4 block, one 8×8 window is required to calculate the block property and the filter footprint is one 7×7 diamond filter for luma and one 5×5 diamond filter for chroma. Therefore, the required line buffer without virtual boundaries is additional 7 luma line buffer and 3 chroma line buffer on top of 4 luma DF line buffer and 2 chroma DF line buffer. The concept of virtual boundaries can still be applied in VVC to reduce the line buffer usage. In the above description, largest coding unit (LCU) is renamed as coding tree unit (CTU) in VVC. However, some modifications are proposed to fit the features of current ALF design.

Non-Linear ALF

In VTM3.0 (VVC (Versatile Video Coding) Test Model Ver. 3.0), the filtering process of the Adaptive Loop Filter, is performed as follows:

$$O(x,y)=\Sigma_{(i,j)}w(i,j)\cdot I(x+i,y+j), \quad (1)$$

In the above equation, samples I(x+i, y+j) are input samples, O(x, y) is the filtered output sample (i.e. filter result), and w(i,j) denotes the filter coefficients. Since the ALF is applied to the reconstructed samples, samples I(x+i, y+j) correspond to reconstructed samples. The center reconstructed pixel at a center location of the ALF processing corresponds to (i, j)=(0, 0), i.e., I(i, j).In practice, in VTM3.0, it is implemented using integer arithmetic for fixed point precision computations:

$$O(x, y) = \left(\sum_{i=-\frac{L}{2}}^{\frac{L}{2}}\sum_{j=-\frac{L}{2}}^{\frac{L}{2}} w(i, j)\cdot I(x + i, y + j) + 64\right) \gg 7, \quad (2)$$

In the above equation, L denotes the filter length, and where w(i,j) are the filter coefficients in fixed point precision.

Equation (1) can be reformulated, without coding efficiency impact, in the following expression:

$$O(x,y)=I(x,y)+\Sigma_{(i,j)\neq(0,0)}w(i,j)\cdot(I(x+i,y+j)-I(x,y)), \quad (3)$$

In the above equation, w(i,j) are the same filter coefficients as in equation (1) except for w(0, 0), which is equal to 1 in equation (3) while it is equal to $(1-\Sigma_{(i,j)\neq(0,0)}w(i,j))$ in equation (1).

Using the above filter formula of equation (3), we can easily introduce nonlinearity to make ALF more efficient by using a simple clipping function to reduce the impact of neighbor sample values (I(x+i, y+j)) when they are very different from the current sample value (I(x, y)) being filtered.

In JVET-M0385 ((J. Taquet, et al., "*Non-Linear Adaptive Loop Filter*", in Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M0385)), a non-linear ALF is disclosed. It introduces an adaptive clipping operation on the input samples values of the Adaptive Loop Filter in test software VTM3.0. The goal of this adaptive clipping is to introduce some non-linearities to limit the difference between the input sample value to be filtered and the other neighbor input sample values of the filter.

According to JVET-M0385, the ALF filter operation is modified as follows:

$$O'(x,y) = I(x,y) + \Sigma_{(i,j)\neq(0,0)} w(i,j) \cdot K(I(x+i,y+j) - I(x,y), k(i,j)), \quad (4)$$

In the above equation, O'(x,y) corresponds to the modified ALF filter output, I(x,y) corresponds to sample before ALF, K(d, b)=min(b, max(−b, d)) is the clipping function, and k(i, j) are clipping parameters, which depends on filter coefficient at the(i, j). The encoder performs the optimization to find the best k(i, j). As shown in equation (4), the clipping function is applied to the difference, (I(x+i, y+j)−(x, y)), which corresponds to the difference between an off-center reconstructed pixel (i.e., I(x+i, y+j), (i,j)≠(0,0)) and the center reconstructed pixel of the ALF (i.e., I(x, y),). According to equation (4), the difference, (I(x+i, y+j)−I(x, y)) is clipped by the clipping function with k(i, j) clipping parameters. The term, K(I(x+i, y+j)−I(x, y), k(i, j)) is referred as a clipped difference in this disclosure. In other words, the modified ALF output, O'(x, y) includes a weighted sum of clipped differences (i.e., $\Sigma_{(i,j)\neq(0,0)} w(i, j) \cdot K(I(x+i, y+j)-I(x, y), k(i, j))$). As shown in equation (4), the weighted sums of the difference between a non-center filter location and the center reconstructed pixel, (I(x+i, y+j)−I(x, y)), is modified to a new term, K(I(x+i,y+j)−I(x,y),k(i,j)). The term (I(x+i, y+j)−I(x, y)) is referred as the original difference between a non-center filter location and the center reconstructed pixel.

In the implementation according to JVET-M0385, the clipping parameters k(i,j) are specified for each ALF filter, where one clipping value is signaled per filter coefficient. It means that 12 clipping values are signaled in the bitstream per Luma filter and 6 clipping values for the Chroma filter.

In order to limit the signaling cost and the encoder complexity, the clipping values are limited to a small set of possible values in JVET-M0385. Furthermore, only 4 possible values are used for Inter slices and 3 possible values are used for Intra slices.

Because the variance of the local differences is often higher for Luma than for Chroma, two different sets are used for the Luma and Chroma filters. Furthermore, the maximum sample value is included in each set, so that clipping can be disabled if it is not necessary.

The proposed sets of clipping values according to JVET-M0385 are provided in Table 2.

TABLE 2

| | Allowed clipping values | |
|---|---|---|
| | INTRA | INTER |
| LUMA | {10, 102, 1024} | {6, 32, 181, 1024} |
| CHROMA | {4, 24, 1024} | {4, 25, 161, 1024} |

The clipping values are encoded in the slice header using a Golomb encoding corresponding to the index of the clipping value in the set.

The clipping values are encoded in the slice header using a k-th exponential-Golomb code corresponding to the index of the clipping value in the set.

Moreover, only when the non-center coefficient is non-zero, the corresponding clipping values are signaled. In other words, before decoding the clipping value, the filter coefficients should be reconstructed first. The syntax table is provided in Table 3.

TABLE 3

An example of syntax table for ALF data.

| | Descriptor |
|---|---|
| alf_data( ) { | |
|   alf_chroma_idc | tu(v) |
|   alf_luma_clip | u(1) |
|   if( alf_choma_idc ) | |
|     alf_chroma_clip | u(1) |
|   alf_luma_num_filters_signalled_minus1 | tb(v) |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|   } | |
|   alf_luma_coeff_delta_flag | u(1) |
|   if ( !alf_luma_coeff_delta_flag && alf_luma_num_filters_signalled_minus1 > 0 ) | |
|     alf_luma_coeff_delta_prediction_flag | u(1) |
|   alf_luma_min_eg_order_minus1 | ue(v) |
|   for( i = 0; i < 3; i++ ) | |
|     alf_luma_eg_order_increase_flag[ i ] | u(1) |
|   if ( alf_luma_coeff_delta_flag ) { | |
|     for( sigFiltIdx = 0; sigFiltIdx <= alf_luma_num_filters_signalled_minus1; sigFiltIdx++ ) | |
|       alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for( j = 0; j < 12; j++ ) { | |

TABLE 3-continued

An example of syntax table for ALF data.

| | Descriptor |
|---|---|
|         alf_luma_coeff_delta_abs[ sigFiltIdx ][ j ] | uek(v) |
|         if( alf_luma_coeff_delta_abs[ sigFiltIdx ][ j ] ) | |
|           alf_luma_coeff_delta_sign[ sigFiltIdx ][ j ] | u(1) |
|         } | |
|     } | |
|   } | |
| } | |
| if( alf_luma_clip ) { | |
|   alf_luma_clip_min_eg_order_minus1 | ue(v) |
|   for( i = 0; i < 3; i++ ) | |
|     alf_luma_clip_eg_order_increase_flag[ i ] | u(1) |
|   for ( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for( j = 0; j < 12; j++ ) { | |
|         if( filterCoefficients[ sigFiltIdx ][ j ] ) | |
|           alf_luma_clip_idx[ sigFiltIdx ][ j ] | uek(v) |
|       } | |
|     } | |
|   } | |
| } | |
| if ( alf_chroma_idc > 0 ) { | |
|   alf_chroma_min_eg_order_minus1 | ue(v) |
|   for( i = 0; i < 2; i++ ) | |
|     alf_chroma_eg_order_increase_flag[ i ] | u(1) |
|   for( j = 0; j < 6; j++ ) { | |
|     alf_chroma_coeff_abs[ j ] | uek(v) |
|     if( alf_chroma_coeff_abs[ j ] > 0 ) | |
|       alf_chroma_coeff_sign[ j ] | u(1) |
|   } | |
| } | |
| if ( alf_chroma_idc > 0 && alf_chroma_clip ) { | |
|   alf_chroma_clip_min_eg_order_minus1 | ue(v) |
|   for( i = 0; i < 2; i++ ) | |
|     alf_chroma_clip_eg_order_increase_flag[ i ] | u(1) |
|   for( j = 0; j < 6; j++ ) { | |
|     if( alf_chroma_coeff_abs[ j ] ) | |
|       alf_chroma_clip_idx[ j ] | uek(v) |
|   } | |
| } | |
| } | |

Reduced Buffer Requirement for ALF Using Virtual Boundary

In JVET-M0301 ((A. Kotra, et al., "Non-CE: Loop filter line buffer reduction", in Joint Video Exploration Team (JVET) of ITU-T SG 16 WP 3 and ISO/IEC JTC 1/SC 29/WG 11, 13th Meeting: Marrakech, Mass., 9-18 Jan. 2019, Document: JVET-M0301)), a mechanism of reducing the line buffer requirement of ALF (adaptive loop filter) is disclosed. The contribution uses the concept of virtual boundaries (VBs) which are upward shifted horizontal CTU boundaries by "N" samples. Modified ALF block classification and modified ALF filtering are applied for the samples which are near the virtual boundary to reduce the number of line buffers required. Modified ALF block classification only uses the samples that are above the VB to classify the given 4×4 block, which is above VB. Similarly for the classification of the 4×4 block below VB, samples belonging to the lines below the VB are used. Modified ALF filtering uses a combination of conditional disabling and truncated versions of the original ALF filter.

Truncated ALF Filtering at Virtual Boundaries

Truncated version of the filters are used for filtering of the Luma samples belonging to the lines close to the virtual boundaries. These truncated versions of the filters can be used for both N=4 and N=6 cases. Similarly, truncated version of the filters are also used for chroma ALF filtering.

In addition to the truncated version of the ALF filtering, conditional disabling of ALF filtering is also considered.

If absolute sum of the padded coefficients is greater than a threshold (T) times the absolute sum of the non-padded coefficients, then the filter is disabled for those respective lines. FIG. 10A-10F illustrate examples of modified luma ALF filter processing at the virtual boundary. FIG. 10A illustrates the modified ALF for line M filtering; FIG. 10B illustrates the modified ALF for line H filtering; FIG. 10C illustrates the modified ALF for line L filtering; FIG. 10D illustrates the modified ALF for line I filtering; FIG. 10E illustrates the modified ALF for line J filtering; and FIG. 10F illustrates the modified ALF for line K filtering.

For example, for lines M and H, if $(2*abs(c0)>(T*(2*(abs(c1)+abs(c2)+abs(c3)+abs(c4)+abs(c5)+abs(c6)+abs(c7)+abs(c8)+abs(c9)+abs(c10)+abs(c11)+abs(c12)))$, then the ALF filtering is disabled for lines M and H.

Similarly, for lines L and I, if $(2*(abs(c0)+abs(c1)+abs(c2)+abs(c3))>(T*(2*(abs(c4)+abs(c5)+abs(c6)+abs(c7)+abs(c8)+abs(c9)+abs(c10)+abs(c11)+abs(c12)))$, then the ALF filtering is disabled for lines L and I.

Similarly, for lines J and K, if $(2*(abs(c0)+abs(c1)+abs(c2)+abs(c3)+abs(c4)+abs(c5)+abs(c6)+abs(c7)+abs(c8))>(T*(2*(abs(c9)+abs(c10)+abs(c11))+abs(c12)))$, then the ALF filtering is disabled for lines J and K.

In the above, T is generally a threshold which can take a fractional values ranging between 0 and 1. For example, T value can be 0.5, 0.6 or 0.7

FIG. 11A-11D illustrate examples of modified chroma ALF filter processing at the virtual boundary. FIG. 11A illustrates the modified ALF for line N filtering; FIG. 11B illustrates the modified ALF for line K filtering; FIG. 11C illustrates the modified ALF for line M filtering; and FIG. 11D illustrates the modified ALF for line L filtering.

For lines N and K, if (2*abs(c0)>(T*(2*(abs(c1)+abs(c2)+abs(c3)+abs(c4)+abs(c5))+abs(c6)))), then the ALF filtering is disabled for lines N and K.

For lines M and L, if ((2*(abs(c0)+abs(c1)+abs(c2)+abs(c3))>(T*(2*(abs(c4)+abs(c5))+abs(c6)))), then the ALF filtering is disabled for lines M and L, where the function abs(x) is defined as follows:

$$\text{Abs}(x) = \begin{cases} x; & x >= 0 \\ -x; & x < 0 \end{cases} \quad (5)$$

BRIEF SUMMARY OF THE INVENTION

A method and apparatus for Adaptive Loop Filter (ALF) processing of reconstructed video are disclosed. According to this method, reconstructed pixels are received, where the reconstructed pixels comprise a current block. One or more clipping values for the ALF processing are determined depending on a bit depth of a center reconstructed pixel at a center location of the ALF processing. A current ALF output is derived for the current block, where the current ALF output comprises a weighted sum of clipped differences of original differences and each of the original differences is calculated between a first reconstructed pixel at a non-center filter location and the center reconstructed pixel, and each of the original differences is clipped according to a corresponding clipping value to form one clipped difference. Filtered-reconstructed pixels are provided, where the filtered-reconstructed pixels comprise the current ALF output.

In one embodiment, different sets of clipping values are used for different bit depths. In another embodiment, different sets of clipping values are used for Intra and Inter coding modes. In yet another embodiment, different sets of clipping values are used for reconstructed luma pixels and reconstructed chroma pixels. In one embodiment, the reconstructed pixels correspond to luma pixels. In another embodiment, the reconstructed pixels correspond to chroma pixels. The clipping values can be signaled in a slice, tile or tile group.

In one embodiment, first clipping values for a first bit depth are derived from second clipping values for a second bit depth by at least one operation corresponding to left-shifting or right-shifting the first clipping values by N bits and N is a positive integer.

In one embodiment, the ALF processing is applied to the reconstructed pixels at an encoder side. In another embodiment, the ALF processing is applied to the reconstructed pixels at a decoder side.

Another method and apparatus for Adaptive Loop Filter (ALF) processing of reconstructed video are disclosed. According to this method, one or more clipping values are determined for the ALF processing, where a target clipping value is always signaled at an encoder side or parsed at a decoder side even if the target clipping value is zero.

Yet another method and apparatus for Adaptive Loop Filter (ALF) processing of reconstructed video are disclosed. According to this method, one or more clipping values are determined for the ALF processing, where said one or more clipping values are encoded at an encoder side or decoded at a decoder side using a fixed-length code. In one embodiment, the fixed-length code corresponds to two-bit codes. In another embodiment, the fixed-length code corresponds to truncated unary codes.

BRIEF DESCRIPTION OF THE DRAWINGS

FIG. 10A illustrates the modified ALF for line M filtering; FIG. 10B illustrates the modified ALF for line H filtering; FIG. 10C illustrates the modified ALF for line L filtering; FIG. 10D illustrates the modified ALF for line I filtering; FIG. 10E illustrates the modified ALF for line J filtering; and FIG. 10F illustrates the modified ALF for line K filtering.

FIG. 11A-11D illustrate examples of modified chroma ALF filter processing at the virtual boundary, where FIG. 11A illustrates the modified ALF for line N filtering; FIG. 11B illustrates the modified ALF for line K filtering; FIG. 11C illustrates the modified ALF for line M filtering; and FIG. 11D illustrates the modified ALF for line L filtering.

FIG. 12 illustrates examples that the samples with the same color are used the same clipping values for a 7×7 filter for the luma component and a 5×5 filter for the chroma component.

DETAILED DESCRIPTION OF THE INVENTION

Figure 1A:
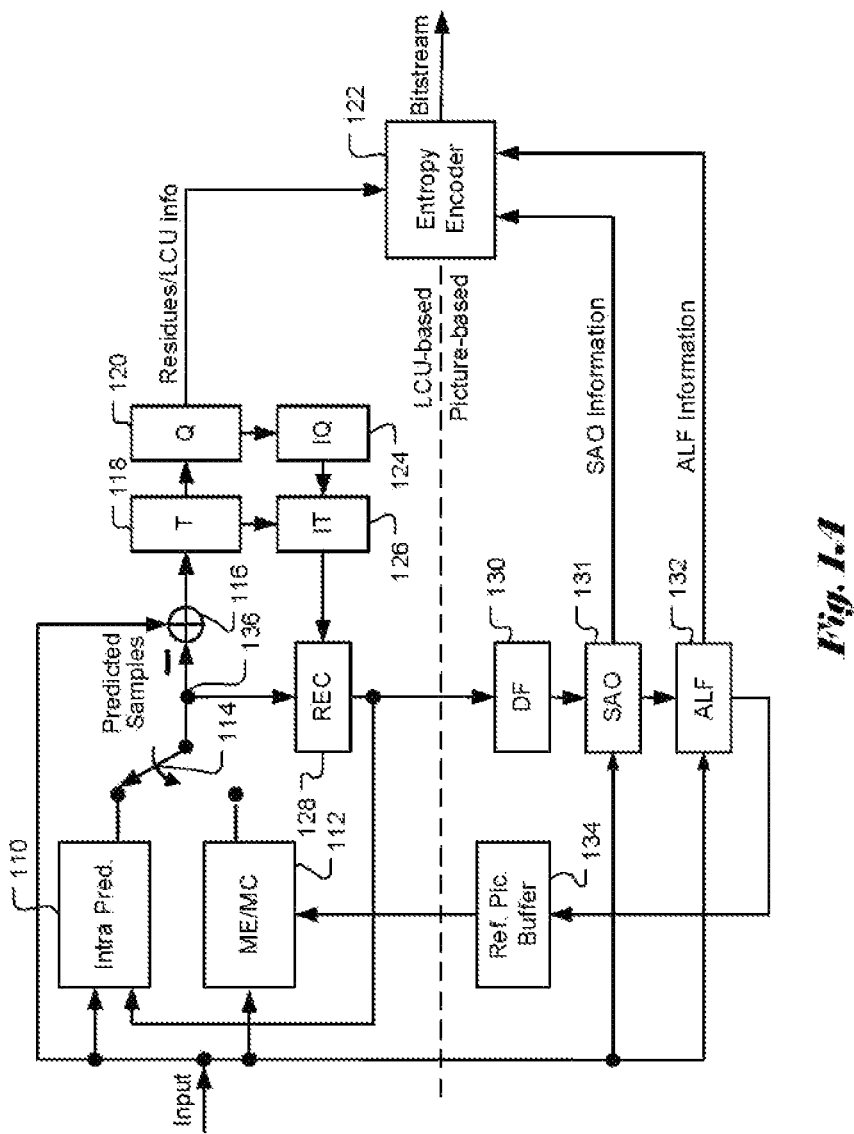
FIG. 1A illustrates an exemplary adaptive inter/intra video encoding system incorporating DF, SAO and ALF in-loop processing.
Figure 1B:
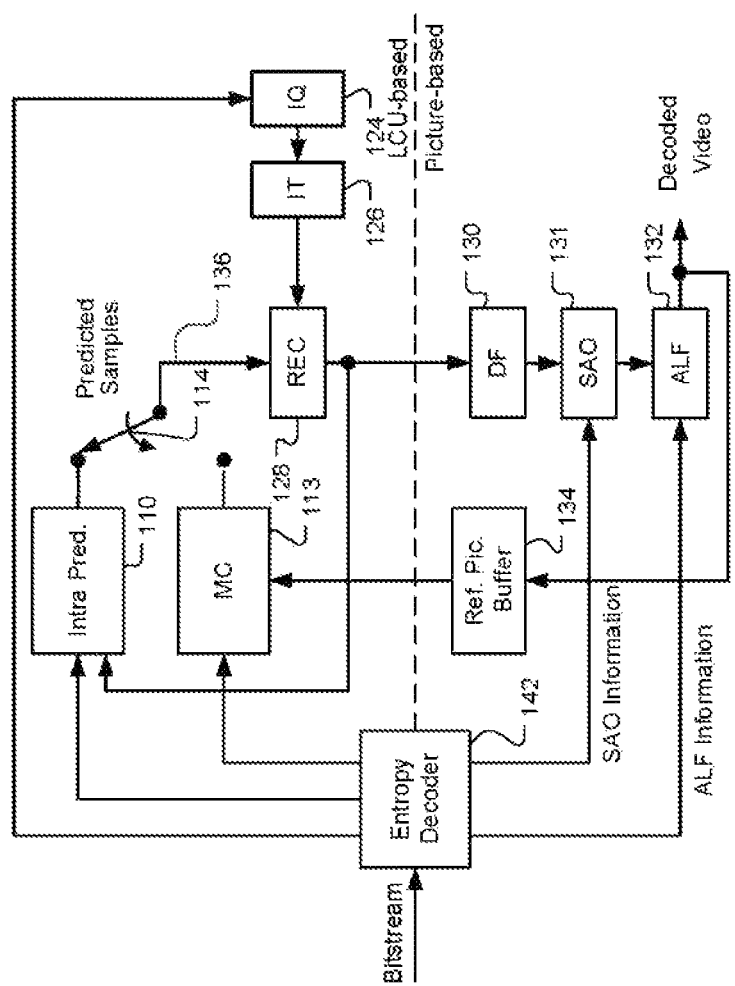
FIG. 1B illustrates an exemplary adaptive inter/intra video decoding system incorporating DF, SAO and ALF in-loop processing.
Figure 2:
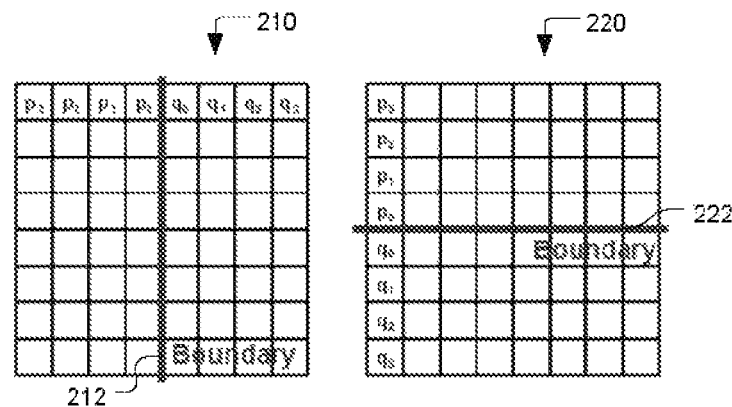
FIG. 2 illustrates an example of deblocking filter process applied on 8×8 block boundaries to reduce the visibility of artefacts at block boundaries, where a vertical boundary and a horizontal boundary are shown.
Figure 3:
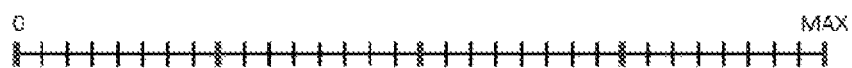
FIG. 3 illustrates an example of band offset (BO), where the pixel intensity range is equally divided into 32 bands and an offset value is determined for each band.
Figure 4:
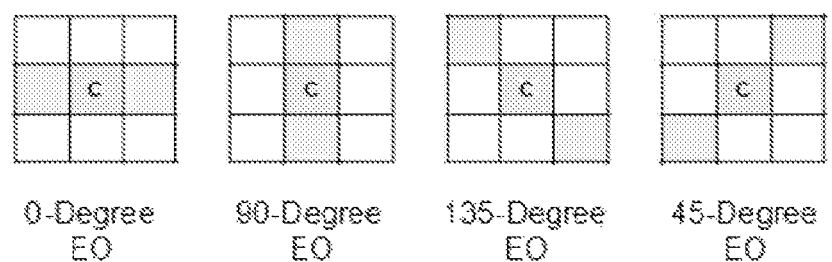
FIG. 4 illustrates Edge Offset (EO) windows corresponding to 0°, 90°, 135°, and 45° used in HEVC (high efficiency video coding) standard to determine the category for a current pixel to apply SAO (Sample Adaptive Offset).
Figure 5:
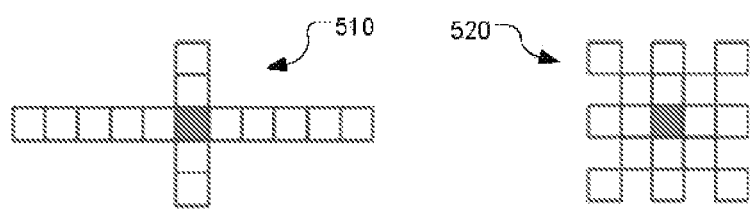
FIG. 5 illustrates an example of adaptive loop filter (ALF), where the ALF has two filter shape options corresponding to cross11×5 and snowflake5×5, for luma and chroma.
Figure 6:
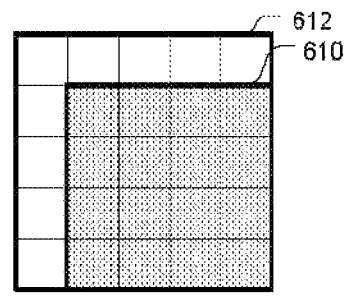
FIG. 6 illustrates an example of edge property calculation of a 4×4 block in block adaptation (BA) mode for adaptive loop filter (ALF).
Figure 7:
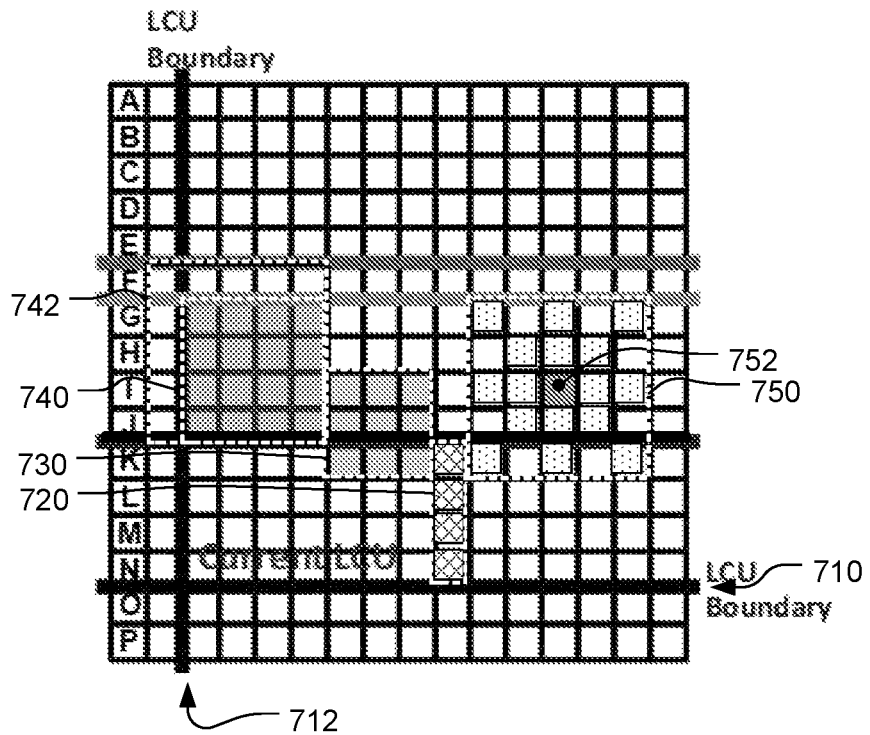
FIG. 7 illustrates an example of the number of luma line buffers required for DF, SAO, and ALF with LCU-based decoding.
Figure 8:
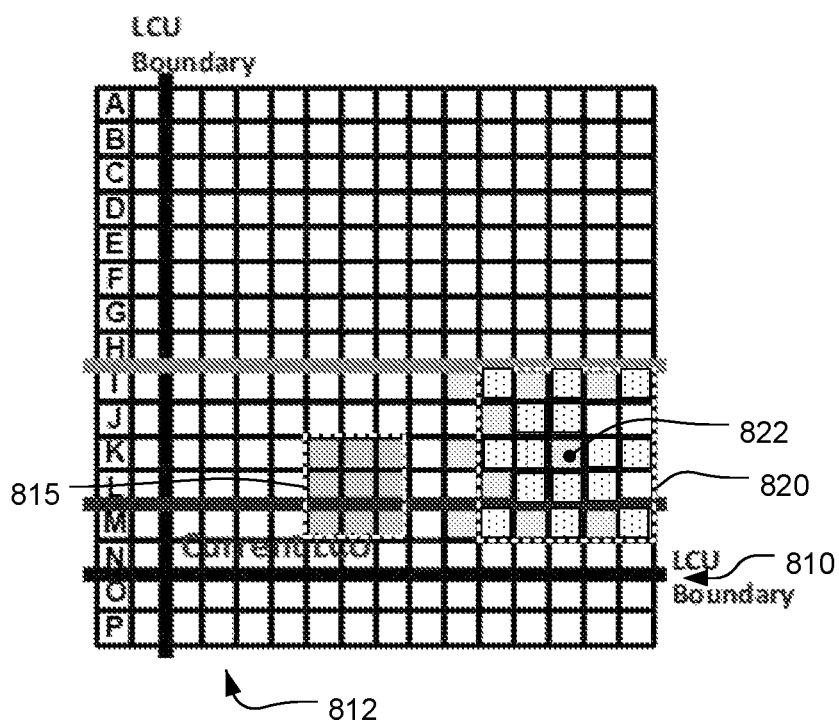
FIG. 8 illustrates an example of the number of chroma line buffers required for DF, SAO, and ALF with LCU-based decoding.
Figure 9A:
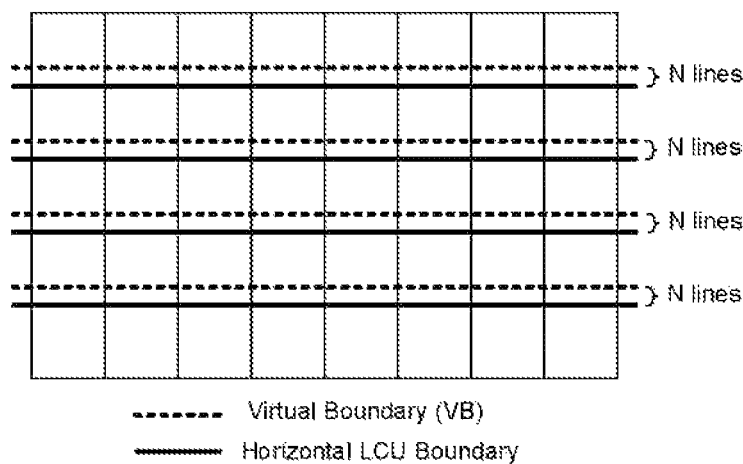
FIG. 9A illustrates an example of VBs by upward shifting horizontal LCU boundaries by N pixels.
Figure 9B:
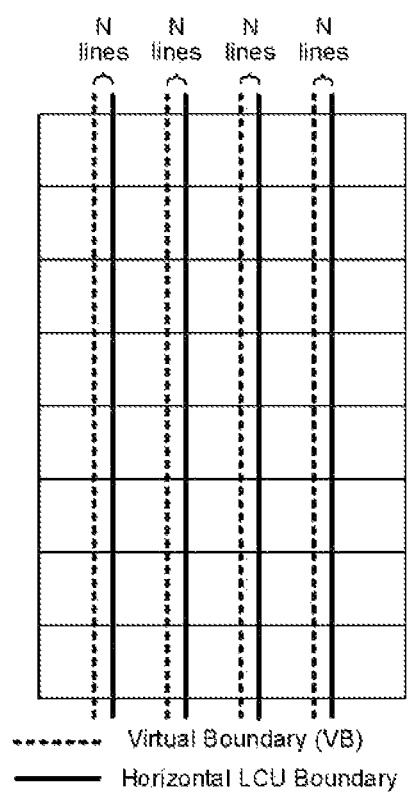
FIG. 9B illustrates an example of VBs by left shifting vertical LCU boundaries by N pixels.
Figure 10A:
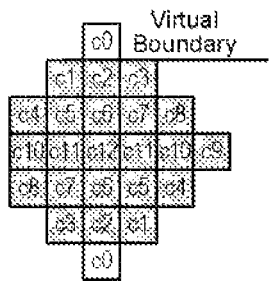
FIG. 10A-10F illustrate examples of modified luma ALF filter processing at the virtual boundary, where
Figure 10B:
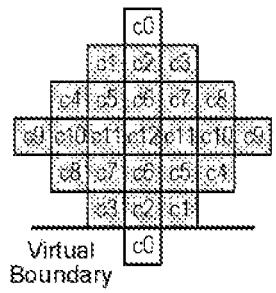
Figure 10C:
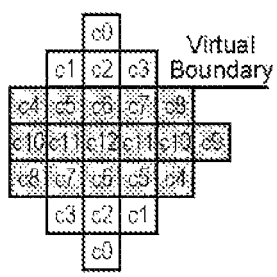
Figure 10D:
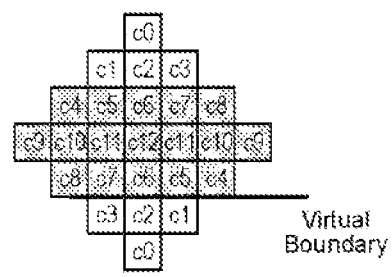
Figure 10E:
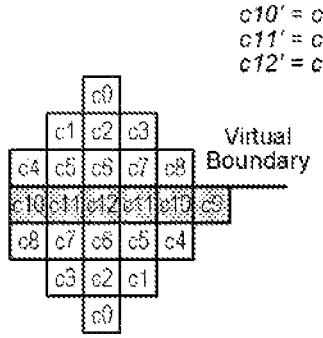
Figure 10F:
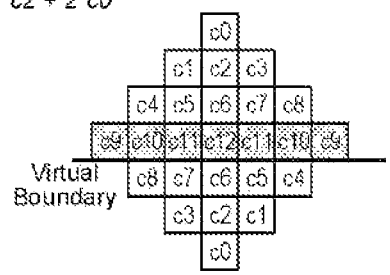

The following description is of the best-contemplated mode of carrying out the invention. This description is made for the purpose of illustrating the general principles of the invention and should not be taken in a limiting sense. The scope of the invention is best determined by reference to the appended claims.

Method 1

In JVET-M0385, a non-linear ALF is proposed. It introduces an adaptive clipping operation on the filtering process of the Adaptive Loop Filter in VTM3.0. Four different sets of clipping values are proposed and the clipping values are encoded in the slice header using the index of the clipping value in the set. All clipping values of four sets are predefined and the selection of the clipping value set is based on the current coded mode (i.e., Intra or Inter), and the current coded color component (i.e., luma or chroma). According to this method, a set of adaptive clipping values are proposed based on the bit-depth of current sample values, wherein such current sample values correspond to center reconstructed pixels at center locations of the ALF processing. For example, there are four different sets of clipping values and the selection of each set can be based on the current coded mode and current coded component. For example, when the bit-depth of a current sample is equal to 10 bits, four clipping set values are set as {10, 102, 1024}, {6, 32, 181, 1024}, {4, 24, 1024}, and {4, 25, 161, 1024}. When the bit-depth of a current sample is equal to 8 bits, all clipping set values will be right shift by 2, i.e. {10>>2, 102>>2, 1024>>2}, {6>>2, 32>>2, 181>>2, 1024>>2}, {4>>2, 24>>2, 1024>>2}, and {4>>2, 25>>2, 161>>2, 1024>>2}. When the bit-depth of a current sample is equal to 12 bits, all clipping set values will be left shift by 2, i.e. {10<<2, 102<<2, 1024<<2}, {6<<2, 32<<2, 181<<2, 1024<<2}, {4<<2, 24<<2, 1024<<2}, and {4<<2, 25<<2, 161<<2, 1024<<2}.

In another embodiment, available number of clipping value can be different based on the bit-depth of current sample. For example, if the bit-depth of a current sample is equal to 10 bits, the four sets of clipping values are designed as {10, 102, 1024}, {6, 32, 181, 1024}, {4, 24, 1024}, and {4, 25, 161, 1024}. However, if the bit-depth of a current sample is equal to 12 bits, only clipping value larger than 100 can be used. If the bit-depth of a current sample is equal to 8 bits, only clipping value smaller than 100 can be used. The index selection can be signaled with ALF filter coefficients at slice header, tile group header, or adaption parameter set.

Method 2

In JVET-M0385, to signal the clipping values, there will be additional 12 parameters for the luma component and 6 parameters for the chroma components in a slice, tile or tile group because the filter footprint is a symmetric 7×7 diamond filter for the luma component and a symmetric 5×5 diamond filter for the chroma components.

According to this method, the number of signaled clipping values is reduced. In one embodiment, to further reduce the number of signaled clipping values, the samples in an ALF filter with the same distance from center position can share the same clipping values. In this way, only 3 additional parameters for the luma component and 2 additional parameters for the chroma components need to be signaled. For example, as shown in FIG. 12, the samples with the same color are used the same clipping values for a 7×7 filter 1210 for the luma component and a 5×5 filter 1220 for the chroma component. In another embodiment, only one clipping value needs to be signaled, and other clipping values with different distances can be derived by adding an offset or multiplying a ratio, where the offset or the ratio is determined by comparing the clipping value at a different distance with the signaled clipping value. The offset or ratio can be a predefined non-zero value and the value is dependent on QP, picture resolution, sample bit-depth, or the offset or ratio can be signaled in a slice, tile, tile group, or adaptation parameter set.

The above methods can also be applied for deriving the chroma ALF filter clipping value. In another embodiment, for the chroma component, the set of clipping values can be derived based on the clipping value of the luma component. The chroma clipping set can directly reuse the clipping set of the luma component or do some modification after reusing. For example, a predefined non-zero offset or a ratio can be used to refine the clipping value set for chroma. The chroma clipping values can be dependent on QP, picture resolution, or sample bit-depth to determine the offset or ratio. Furthermore, the offset or ratio can be directly signaled in a slice, tile, tile group, or adaptation parameter set.

In another embodiment, the clipping technology can also be used on the output of ALF filtering and the current sample. The ALF filter is modified as follows:

$$O'(x, y) - I(x, y) =$$
$$I(x, y) + M\left(\sum_{(i,j)\neq(0,0)} w(i, j) \cdot K(I(x+i, y+j) - I(x, y), k(i, j)), m(i, j)\right)$$

In the above equation, $M(d, b)=\min(b, \max(-b, d))$ is the clipping function, and $m(i,j)$ are clipping parameters, which depends on the $(i, j)$ filter coefficient. The encoder performs the optimization to find the best $m(i,j)$.

The clipping parameters $m(i,j)$ can apply all the modification of clipping value as $k(i,j)$ as disclosed above.

In another embodiment, the clipping technology can be used only on the output of ALF filtering and current sample. The ALF filter is modified as follows:

$$O'(x, y) - I(x, y) =$$
$$I(x, y) + M\left(\sum_{(i,j)\neq(0,0)} w(i, j) \cdot (I(x+i, y+j) - I(x, y)), m(i, j)\right)$$

The clipping parameters $m(i,j)$ can apply all the modifications of clipping value as $k(i, j)$ as disclosed above.

Method 3

In JVET-M0385, only when the non-center coefficient is non-zero, the corresponding clipping values are signaled. In other words, before decoding the clipping value, the filter coefficients should be reconstructed first. However, this will introduce some latency or parsing throughput issue. In order to solve this issue, the following method is proposed. In one embodiment, the corresponding clipping values are always signaled, even if the non-center coefficient is zero. In another embodiment, the corresponding clipping values (i.e., alf_luma_clip_idx[ ][ ]) are always signaled, when filter coefficient prediction, as indicated by alf_luma_coeff_delta_prediction_flag, is used as shown in the exemplary syntax table in Table 4. However, if the filter coefficient prediction is not enabled, then the corresponding clipping values are conditionally signaled. As shown in Table 4, alf_luma_clip_idx[sigFiltIdx][j] is signaled only if filterCoefficients[sigFiltIdx][j] or alf_luma_coeff_delta_prediction_flag is non-zero.

TABLE 4

An example of syntax table for ALF data.

| | Descriptor |
|---|---|
| alf_data( ) { | |
|   alf_chroma_idc | tu(v) |
|   alf_luma_clip | u(1) |
|   if( alf_choma_idc ) | |
|     alf_chroma_clip | u(1) |
|   ... | |
|   if ( !alf_luma_coeff_delta_flag && alf_luma_num_filters_signalled_minus1 > 0 ) | |
|     alf_luma_coeff_delta_prediction_flag | u(1) |
|   ... | |
|   if( alf_luma_clip ) { | |
|     alf_luma_clip_min_eg_order_minus1 | ue(v) |
|     for( i = 0; i < 3; i++ ) | |
|       alf_luma_clip_eg_order_increase_flag[ i ] | u(1) |

TABLE 4-continued

An example of syntax table for ALF data.

| | Descriptor |
|---|---|
|   for ( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for( j = 0; j < 12; j++ ) { | |
|         if(     filterCoefficients[ sigFiltIdx ][ j ]   || alf_luma_coeff_delta_prediction_flag) | |
|           alf_luma_clip_idx[ sigFiltIdx ][ j ] | uek(v) |
|       } | |
|     } | |
|   } | |
| } | |
| ... | |

When fixed filter sets are allowed, then the filter coefficients defined in the fixed filters can also be used to predict filter coefficients. Therefore, the criteria of signaling clipping values should also consider this factor. An exemplary syntax table incorporating the embodiment is shown in Table 5. Accordingly, when filter coefficient prediction is enabled (i.e., the predictor being one fixed filter as indicated by (alf_luma_use_fixed_filter_flag && alf_luma_fixed_filter_usage[filtidx])) or the previous signaled filter as indicated by alf_luma_coeff_delta_prediction_flag), the clipping values are always signaled. If the filter coefficient prediction is disabled, then the clipping values are signaled when the filter coefficient is non zero.

TABLE 5

An example of syntax table for ALF data.

```
for ( sigFiltIdx = 0; sigFiltIdx <= alf_luma_num_filters_signalled_minus1;
sigFiltIdx++ ) {
    if ( alf_luma_coeff_flag[ sigFiltIdx ] ) {
        for( j = 0; j < 12; j++ ) {
            if( filterCoefficients[ sigFiltIdx ][ j ]
            || alf_luma_coeff_delta prediction_flag
            || ( alf_luma_use_fixed_filter_flag && alf_luma_fixed_filter_usage[
filtidx ]))
                alf_luma_clip_idx[ sigFiltIdx ][ j ]                              uek(v)
        }
    }
}
```

In another embodiment, the syntax of signaling clipping values is simplified. The k-th order exponential Golomb codes are replaced by one fixed-length code, for example, two bits (i.e., alf_luma_clip_idx[ ][ ] and alf_chroma_clip_idx[ ] using u(2) in Table 6, where u(u) means unsigned integer using 2 bits.) or truncated unary codes (i.e., alf_luma_clip_idx[ ][ ] and alf_chroma_clip_idx[ ] using tu(v) in Table 7, where tu(v) means truncated unary using up to maxVal bits with maxVal defined in the semantics of the symtax element.) as shown in the exemplary syntax table in Table 6 and Table 7.

TABLE 6

An example of syntax table for ALF data.

| | Descriptor |
|---|---|
| alf_data( ) { | |
|   ... | |
|   if( alf_luma_clip ) { | |
|     alf_luma_clip_min_eg_order_minus1 | ue(v) |
|     for( i = 0; i < 3; i++ ) | |
|       alf_luma_clip_eg_order_increase_flag[ i ] | u(1) |

TABLE 6-continued

An example of syntax table for ALF data.

| | Descriptor |
|---|---|
| for ( sigFiltIdx = 0; sigFiltIdx <= alf_luma_num_filters_signalled_minus1; sigFiltIdx++ ) {<br>    if ( alf_luma_coeff_flag[ sigFiltIdx ] ) {<br>        for( j = 0;j < 12 ; j++ ) {<br>           if( filterCoefficients[ sigFiltIdx ][ j ])<br>              alf_luma_clip_idx[ sigFiltIdx ][ j ] | u(2) |
|         }<br>    }<br>}<br>...<br>if ( alf_chroma_idc > 0 && alf_chroma_clip ) {<br>  alf_chroma_clip_min_eg_order_minus1 | ue(v) |
|   for( i = 0; i < 2; i++ )<br>    alf_chroma_clip_eg_order_increase_flag[ i ] | u(1) |
|   for( j = 0; j < 6; j++ ) {<br>    if( alf_chroma_coeff_abs[ j ] )<br>      alf_chroma_clip_idx[ j ] | u(2) |
|   }<br>}<br>... | |

TABLE 7

An example of syntax table for ALF data.

| | Descriptor |
|---|---|
| alf_data( ) {<br>  ...<br>  if( alf_luma_clip ) {<br>    alf_luma_clip_min_eg_order_minus1 | ue(v) |
|     for( i = 0; i < 3; i++ )<br>      alf_luma_clip_eg_order_increase_flag[ i ] | u(1) |
|     for ( sigFiltIdx = 0; sigFiltIdx <= alf_luma_num_filters_signalled_minus1; sigFiltIdx++ ) {<br>      if ( alf_luma_coeff_flag[ sigFiltIdx ] ) {<br>        for( j = 0; j < 12; j++ ) {<br>          if(    filterCoefficients[ sigFiltIdx ][ j ]    \|\|<br>alf_luma_coeff_delta_prediction_flag)<br>            alf_luma_clip_idx[ sigFiltIdx ][ j ] | tu(v) |
|         }<br>      }<br>    }<br>  }<br>  ...<br>  if ( alf_chroma_idc > 0 && alf_chroma_clip ) {<br>    alf_chroma_clip_min_eg_order_minus1 | ue(v) |
|     for( i = 0; i < 2; i++ )<br>      alf_chroma_clip_eg_order_increase_flag[ i ] | u(1) |
|     for( j = 0; j < 6; j++ ) {<br>      if( alf_chroma_coeff_abs[ j ] )<br>        alf_chroma_clip_idx[ j ] | tu(v) |
|     }<br>  }<br>  ... | |

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 13:
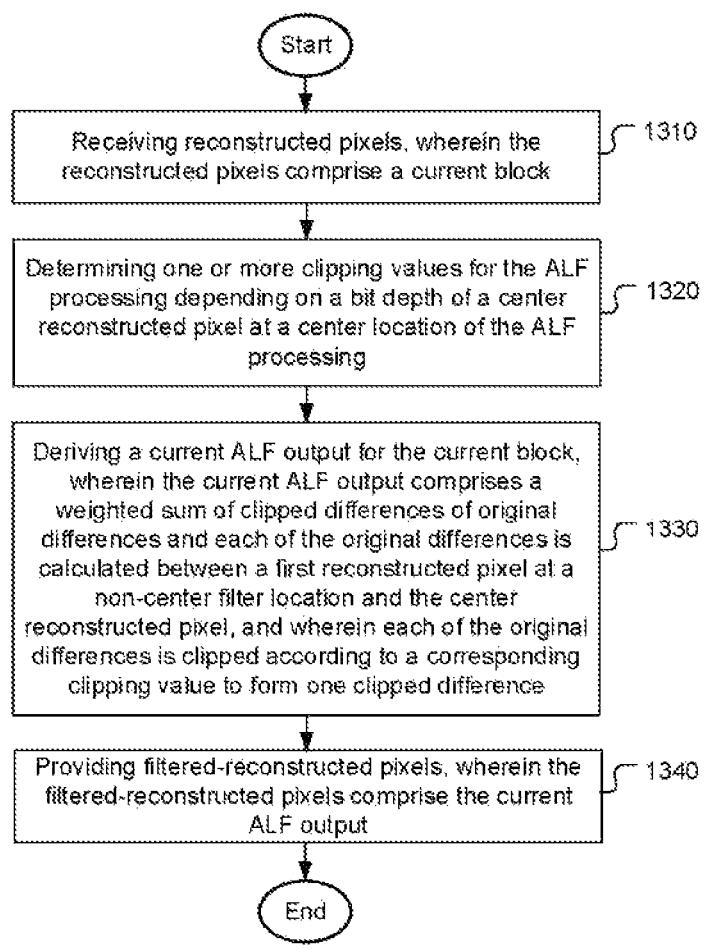
FIG. 13 illustrates a flowchart of an exemplary ALF processing of reconstructed video according to an embodiment of the present invention, where the clipping values for the ALF processing depends on a bit depth of a center reconstructed pixel being filtered.

FIG. 13 illustrates a flowchart of an exemplary ALF processing of reconstructed video according to an embodiment of the present invention, where the clipping values for the ALF processing depends on a bit depth of a center reconstructed pixel being filtered. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels are received in step 1310, wherein the reconstructed pixels comprise a current block. One or more clipping values are determined for the ALF processing depending on a bit depth of a center reconstructed pixel at a center location of the ALF processing in step 1320. A current ALF output is derived for the current block in step 1330, wherein the current ALF output comprises a weighted sum of clipped differences of original differences and each of the original differences is calculated between a first reconstructed pixel at a non-center filter location and the center reconstructed pixel, and wherein each of the original differences is clipped according to a corresponding clipping value to form one clipped difference. The filtered-reconstructed pixels are provided in step 1340, wherein the filtered-reconstructed pixels comprise the current ALF output.

Figure 14:
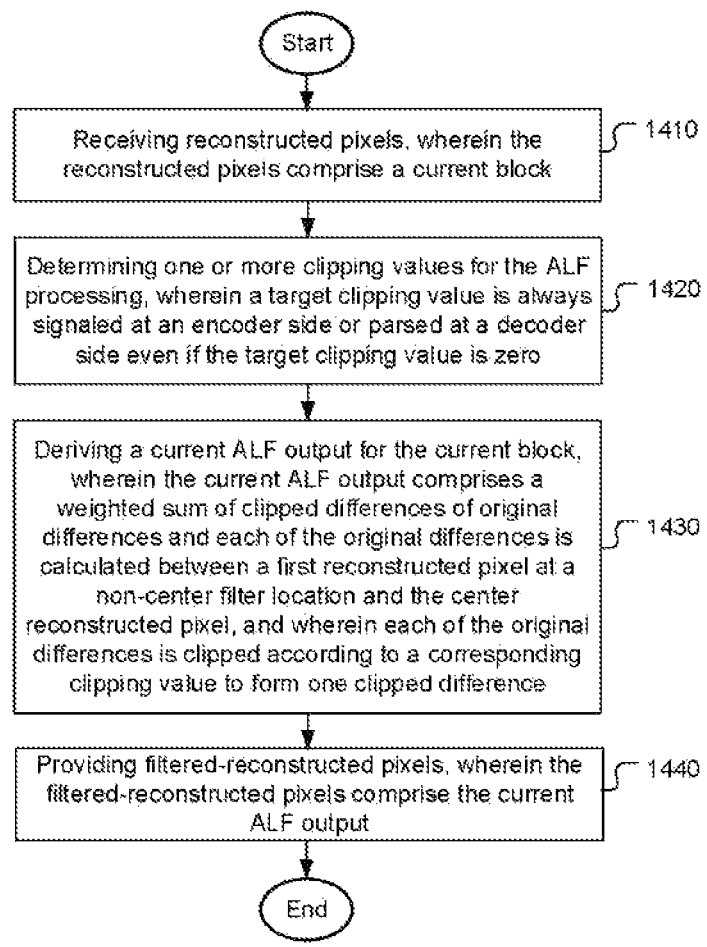
FIG. 14 illustrates a flowchart of an exemplary ALF processing of reconstructed video according to an embodiment of the present invention, where a target clipping value is always signaled at an encoder side or parsed at a decoder side even if the target clipping value is zero.

FIG. 14 illustrates a flowchart of an exemplary ALF processing of reconstructed video according to an embodiment of the present invention, where a target clipping value is always signaled at an encoder side or parsed at a decoder side even if the target clipping value is zero. According to this method, reconstructed pixels are received in step 1410, wherein the reconstructed pixels comprise a current block. One or more clipping values are determined for the ALF processing in step 1420, wherein a target clipping value is always signaled at an encoder side or parsed at a decoder side even if the target clipping value is zero. A current ALF output is derived for the current block in step 1430, wherein the current ALF output comprises a weighted sum of clipped differences of original differences and each of the original differences is calculated between a first reconstructed pixel at a non-center filter location and the center reconstructed pixel, and wherein each of the original differences is clipped according to a corresponding clipping value to form one clipped difference. The filtered-reconstructed pixels are provided in step 1440, wherein the filtered-reconstructed pixels comprise the current ALF output.

Figure 15:
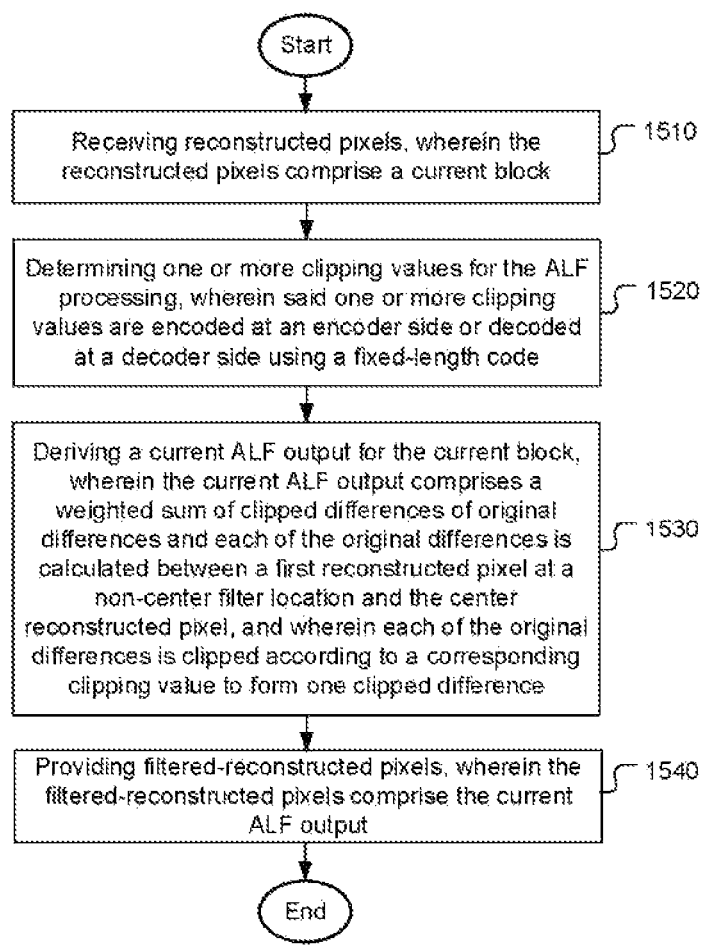
FIG. 15 illustrates a flowchart of an exemplary ALF processing of reconstructed video according to an embodiment of the present invention, where the clipping values are encoded at an encoder side or decoded at a decoder side using a fixed-length code.

FIG. 15 illustrates a flowchart of an exemplary ALF processing of reconstructed video according to an embodiment of the present invention, where the clipping values are encoded at an encoder side or decoded at a decoder side using a fixed-length code. According to this method, reconstructed pixels are received in step 1510, wherein the reconstructed pixels comprise a current block. One or more clipping values are determined for the ALF processing in step 1520, wherein said one or more clipping values are encoded at an encoder side or decoded at a decoder side using a fixed-length code. A current ALF output is derived for the current block in step 1530, wherein the current ALF output comprises a weighted sum of clipped differences of original differences and each of the original differences is calculated between a first reconstructed pixel at a non-center filter location and the center reconstructed pixel, and wherein each of the original differences is clipped according to a corresponding clipping value to form one clipped difference. The filtered-reconstructed pixels are provided in step 1540, wherein the filtered-reconstructed pixels comprise the current ALF output.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for Adaptive Loop Filter (ALF) processing of reconstructed video, the method comprising:
   receiving reconstructed pixels, wherein the reconstructed pixels comprise a current block;
   determining one or more clipping values for the ALF processing, wherein a target clipping value is always signaled at an encoder side or parsed at a decoder side even if the target clipping value is zero;
   deriving a current ALF output for the current block, wherein the current ALF output comprises a weighted sum of clipped differences of original differences and each of the original differences is calculated between a first reconstructed pixel at a non-center filter location and a center reconstructed pixel at a center filter location, and wherein each of the original differences is clipped according to a corresponding clipping value to form one clipped difference; and
   providing filtered-reconstructed pixels, wherein the filtered-reconstructed pixels comprise the current ALF output.

2. The method of claim 1, wherein said one or more clipping values are signaled in a slice, tile or tile group.

3. An apparatus for Adaptive Loop Filter (ALF) processing of reconstructed video, the apparatus comprising one or more electronic circuits or processors arranged to:

receive reconstructed pixels, wherein the reconstructed pixels comprise a current block;

determine one or more clipping values for the ALF processing, wherein a target clipping value is always signaled at an encoder side or parsed at a decoder side even if the target clipping value is zero;

derive a current ALF output for the current block, wherein the current ALF output comprises a weighted sum of clipped differences of original differences and each of the original differences is calculated between a first reconstructed pixel at a non-center filter location and a center reconstructed pixel at a center filter location, and wherein each of the original differences is clipped according to a corresponding clipping value to form one clipped difference; and provide filtered-reconstructed pixels, wherein the filtered-reconstructed pixels comprise the current ALF output.

4. A method for Adaptive Loop Filter (ALF) processing of reconstructed video, the method comprising:

receiving reconstructed pixels, wherein the reconstructed pixels comprise a current block;

determining one or more clipping values for the ALF processing, wherein said one or more clipping values are encoded at an encoder side or decoded at a decoder side using a fixed-length code;

deriving a current ALF output for the current block, wherein the current ALF output comprises a weighted sum of clipped differences of original differences and each of the original differences is calculated between a first reconstructed pixel at a non-center filter location and a center reconstructed pixel at a center filter location, and wherein each of the original differences is clipped according to a corresponding clipping value to form one clipped difference; and providing filtered-reconstructed pixels, wherein the filtered-reconstructed pixels comprise the current ALF output.

5. The method of claim 4, wherein the fixed-length code corresponds to two-bit codes.

6. The method of claim 4, wherein the fixed-length code corresponds to truncated unary codes.

7. The method of claim 4, wherein said one or more clipping values are signaled in a slice, tile or tile group.

8. An apparatus for Adaptive Loop Filter (ALF) processing of reconstructed video, the apparatus comprising one or more electronic circuits or processors arranged to:

receive reconstructed pixels, wherein the reconstructed pixels comprise a current block;

determine one or more clipping values for the ALF processing, wherein said one or more clipping values are encoded at an encoder side or decoded at a decoder side using a fixed-length code;

derive a current ALF output for the current block, wherein the current ALF output comprises a weighted sum of clipped differences of original differences and each of the original differences is calculated between a first reconstructed pixel at a non-center filter location and a center reconstructed pixel at a center filter location, and wherein each of the original differences is clipped according to a corresponding clipping value to form one clipped difference; and provide filtered-reconstructed pixels, wherein the filtered-reconstructed pixels comprise the current ALF output.

* * * * *